United States Patent [19]
Yamaura et al.

[11] Patent Number: 6,113,807
[45] Date of Patent: Sep. 5, 2000

[54] PHOSPHOR AND METHOD FOR PRODUCING SAME

[75] Inventors: Tatsuo Yamaura; Shigeo Itoh; Hitoshi Toki, all of Mobara; Vladimir Mordkovich, Moegino, all of Japan

[73] Assignee: Futaba Denshi Kogyo K.K., Chiba-ken, Japan

[21] Appl. No.: 09/191,524

[22] Filed: Nov. 13, 1998

[30] Foreign Application Priority Data

Dec. 3, 1997 [JP] Japan .................................... 9-333068

[51] Int. Cl.⁷ ..................................................... C09K 11/65
[52] U.S. Cl. ............................. 252/301.4 R; 252/301.45; 252/301.6 R; 252/301.65; 428/670; 427/157; 427/249.1; 427/253.31; 427/255.32; 427/255.33; 427/255.39; 427/255.394

[58] Field of Search ...................... 252/301.45, 301.4 R, 252/301.65, 301.6 R; 428/690; 427/157, 249.1, 255.31, 255.32, 255.39, 255.33, 252.394

*Primary Examiner*—C. Melissa Koslow
*Attorney, Agent, or Firm*—Breiner & Breiner

[57] ABSTRACT

A method for producing a phosphor made of luminous inorganic particles of a nanostructure which is capable of keeping a surface of the phosphor from being polluted by any by-product and controlling a particle diameter distribution of the phosphor as desired. A carbon material and an inorganic salt are mixed together to prepare a mixture, which is then heated, to thereby form an interlaminar compound. Then, the interlaminar compound is subject to a treatment using an eliminating agent, leading to production of luminous inorganic compound particles adhered to the carbon material.

8 Claims, No Drawings

PHOSPHOR AND METHOD FOR PRODUCING SAME

BACKGROUND OF THE INVENTION

This invention relates to a method for producing a phosphor, and more particularly a method for producing a phosphor using carbon particles of a nanostructure and a phosphor produced by the method.

A method for producing a phosphor using ultrafine particulate crystals (hereinafter referred to as "nanocrystals") of oxides activated with rare earth elements is disclosed in U.S. Pat. No. 5,637,258. The nanocrystal oxides disclosed are produced according to a method similar to sol-gel techniques. The method is executed at a room temperature using a solution of Y—Eu n-butoxide [Y—Eu(On-Bu)x] in butanol ($C_4H_9OH$).

An n-butoxide solution of yttrium (Y) and Eu acting as an activator element is prepared as follows:

Synthesis of Y n-butoxide is carried out by preparing Na iso-propoxide via a reaction between metal Na and iso-propanol and adding $YCl_3$ to the Na iso-propoxide to obtain Y iso-propoxide.

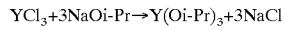

$YCl_3+3NaOi-Pr \rightarrow Y(Oi-Pr)_3+3NaCl$

Then, n-butanol is added to the solution thus obtained, to thereby replace the iso-propyl group with an n-butyl group, followed by azeotropic distillation, resulting in obtaining Y n-butoxide.

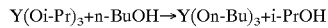

$Y(Oi-Pr)_3+n-BuOH \rightarrow Y(On-Bu)_3+i-PrOH$

Synthesis of n-butoxide of an activator such as Eu or the like may be carried out in a manner similar to that of Y butoxide.

Mixing between n-butoxide of Y synthesized and that of the activator Eu at a temperature of 117° C. leads to an n-butoxide solution of Eu acting as an activator element and Y.

Now, conventional synthesis of a phosphor constituted by nanocrystals of oxides activated with rare earth elements which is carried out using the thus-prepared solution of Y—Eu n-butoxide [Y—Eu(On-Bu)x] in butanol ($C_4H_9OH$) will be described hereinafter.

Acetic acid is added to the Y—Eu n-butoxide/butanol solution, leading to acetylation of the solution, as follows:

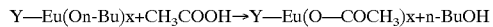

Y—Eu(On-Bu)x+$CH_3COOH \rightarrow$ Y—Eu(O—$COCH_3$)x+n-BuOH

Both are mixed together and allowed to stand for 0.5 to 1.0 hour, during which the reaction takes place, resulting in the Y—Eu acetate and n-butanol being produced. The pH is ~8.0, which is alkaline. Addition of acetic acid thereto causes the pH to be decreased to ~5.0.

Then, water is added to the solution, leading to hydrolysis, resulting in hydroxide of Y—Eu being formed.

Y—Eu(O—$COCH_3$)x+n-BuOH +$H_2O \rightarrow$ Y—Eu(OH)$_3$+OH

Then, an aqueous NaOH solution is added to the solution containing the hydroxide of Y—Eu at 85° C. to adjust the pH at 13.5, resulting in nanocrystals of yttrium oxide activated with Eu ($Y_2O_3$:Eu) being precipitated.

The thus-precipitated nanocrystal particles are then washed with water and acetone, to thereby remove any organic by-products therefrom. The particles are dried, followed by washing with a dilute NaOH solution.

As will be noted from the above, the conventional method for manufacturing the nanocrystal oxide phosphor includes a variety of reaction steps using various kinds of solvents, so that a surface of the particles of the phosphor ultimately obtained is polluted by the organic by-products. This causes the pollutant to absorb luminous energy on the surface of the particles of the phosphor, resulting in luminescence of the phosphor being restrained. Such a phenomenon is called non-luminous relaxation. In order to avoid such a problem, it would be considered to carry out calcination of the phosphor for removal of the by-products. However, the calcination causes the by-products heated to intrude between the fine particles of the phosphor, leading to a failure in complete removal of the by-products.

Also, the conventional method fails to control a particle size distribution of the phosphor particles produced, leading to spreading of a luminous band of the phosphor.

SUMMARY OF THE INVENTION

The present invention has been made in view of the foregoing disadvantage of the prior art.

Accordingly, it is an object of the present invention to provide a method for producing a phosphor which is made of luminous inorganic particles of a nanostructure and of which a surface is kept from being polluted by any by-product.

It is another object of the present invention to provide a method for producing a phosphor which is capable of controlling a particle diameter distribution of the phosphor as desired.

In accordance with one aspect of the present invention, a method for producing a phosphor is provided. The method includes the steps of mixing a carbon material and an inorganic salt with each other to prepare a mixture, heating the mixture, resulting in forming an intercalation complex or interlaminar compound, and subjecting the interlaminar compound to a treatment using an eliminating agent, to thereby produce luminous inorganic compound particle material adhered to the carbon material.

In a preferred embodiment of the present invention, the carbon material is a fine carbon particle material of a nanostructure.

In a preferred embodiment of the present invention, the fine carbon particle material of a nanostructure is selected from the group consisting of a carbon nanotube, a carbon fiber and soot.

In a preferred embodiment of the present invention, the inorganic salt is selected from the group consisting of a chloride, a bromide, a nitrate and a mixed crystal thereof.

In a preferred embodiment of the present invention, the eliminating agent is selected from the group consisting of oxygen, water, ammonia and hydrogen sulfide.

In a preferred embodiment of the present invention, the inorganic compound particle material is selected from the group consisting of an oxide, a nitride and a sulfide.

In accordance with another aspect of the present invention, a phosphor is provided, which is produced by the above-described method and includes a carbon material of a nanostructure and a luminous inorganic compound particle material adhered to the carbon material.

In a preferred embodiment of the present invention, the inorganic compound particle material is selected from the group consisting of an oxide, a nitride and a sulfide.

DETAILED DESCRIPTION OF THE PREFERRED EMBODIMENT

The conventional method, as described above, includes a variety of reaction steps using various kinds of solvents, so that the surface of the particles of the phosphor ultimately obtained is polluted by the organic by-products, leading to non-luminous relaxation. Also, the conventional method fails to control a particle size distribution of the phosphor particles obtained, resulting in spreading of a luminous band thereof. In view of the above, the present invention employs a non-solvent process to solve pollution of the surface and employs a material of a nanostructure having a fixed size distribution as a carrier for phosphor nanoparticles in order to solve the above-described failure in control of particle size distribution.

The inventors took notice of the fact that interlaminar bonding and elimination are carried out between many kinds of metal compounds and carbon materials such as graphite, a carbon nanotube and the like. As a result, it was found that an interlaminar bonding or elimination reaction between the metal compound and the carbon material permits the nanostructural carbon material to act as a carrier for nanoparticles of a luminous inorganic compound, to thereby form a composite product which exhibits increased luminous efficiency as compared with the conventional phosphor. In this instance, if any activator ion is required, it may be introduced into the complex material by a co-interlaminar bonding phenomenon during the interlaminar reaction.

In the present invention, first of all, a carbon material of a nanostructure such as a carbon nanotube or the like is subject to an interlaminar reaction with an inorganic compound such as $ZnCl_2$, $YCl_3$, $Zn(NO_3)_2$, $CuCl$ or the like. The inorganic compound may include a luminous center constituted of a transition metal element such as $Mn^{2+}$ or the like or a rare earth element such as $Eu^{3+}$ or the like. Alternatively, it may be free of such a luminous center. The reaction is carried out at a temperature of between 200° C. and 800° C. in a suitable atmosphere. The atmosphere may be selected from the group consisting of a vacuum atmosphere, a chlorine gas atmosphere, an air atmosphere and the like. The reaction provides an intercalation complex or interlaminar compound or a composite product doped with the luminous center. The carbon material such as a nanostructural carbon material or the like acts as a matrix for the inorganic compound which is an external material. Then, the interlaminar elimination reaction permits the external material to be present in the form of nanoparticles on a surface of the nanostructural carbon material by an action of an eliminating material such as oxygen or water. The interlaminar elimination is advanced at a temperature of from a room temperature to 800° C.

The method of the present invention constructed as described above produces a phosphor made of luminous inorganic particles which does not cause the surface pollution, to thereby eliminate the non-luminous relaxation. Also, the phosphor produced permits a particle size distribution thereof to be controlled, resulting in spreading of the luminous band being minimized.

As can be seen from the foregoing, the present invention produces a phosphor having a clear surface and a narrow particle size distribution, to thereby exhibit increased luminous efficiency.

The present invention will understood more readily with reference to the following examples; however, these examples are intended to illustrate the invention and are not to be construed to limit the scope of the invention.

EXAMPLE 1

A carbon nanotube material in an amount of 1 g was charged in a glass tube together with a mixture of 1.1 g of yttrium chloride and 40 mg of europium chloride. The glass tube was charged with chlorine gas, followed by sealing of the glass tube. Then, the glass tube was heated at 800° C. for 6 days, leading to an interlaminar bonding reaction. The interlaminar bonding reaction was carried out according to the following reaction formula:

$$18C + Y(Eu)Cl_3 \rightarrow C_{18}Y(Eu)Cl_3$$

An intercalation complex or interlaminar compound synthesized by the reaction was removed from the glass tube and left to stand for 1 hour at 200° C. while being exposed to flowing of moist air which contains moisture, leading to an elimination reaction. The elimination reaction was advanced according to the following reaction formula:

$$2C_{18}Y(Eu)Cl_3 + 3H_2O \rightarrow [Y(Eu)]_2O_3 + 36C + 6HCl\uparrow$$

Oxidized Y—Eu particles obtained by the reaction were kept at a position at which the particles were formed. More particularly, the particles each were adhered to a surface of each of the individual carbon nanotubes. A size of the luminous oxide nanoparticles was determined depending on a size of the individual carbon nanotubes (which was varied between 1 nm and 30 nm). It was confirmed that the thus-obtained specimen exhibited PL light of a red luminous color by $Eu^{3+}$ due to ultraviolet excitation at 25 nm.

EXAMPLE 2

An activated carbon fiber material in an amount of 1 g was charged in a glass tube together with 1.1 g of zinc bromide. Then, the glass tube was sealedly closed. Then, the mixture was heated at 340° C. for 12 hours, resulting in being subject to a reaction. The reaction produced a composite product $C_{10}ZnBr_2$ wherein the carbon material was doped with zinc bromide. The zinc bromide was adhered to a surface of a carbon fiber which was formed with fine holes or pores of a size as small as nanometers while being distributed on the surface, leading to formation of the composite product.

Then, the composite product thus synthesized was removed from the glass tube and left to stand for 3 hours at 400° C. in an oxygen stream, resulting in an elimination reaction being carried out. As a result of the elimination, zinc oxide in the form of nanoparticles was formed in the pores of the activated carbon fiber material. Partial oxidation of carbon in oxygen permitted 80% of the zinc oxide nano particles or more to be contained in the product.

Thereafter, the specimen thus obtained was subject to excitation by ultraviolet rays at 365 nm, resulting in emitting PL light of a blue luminous color. It is commonly known that ZnO emits light of a greenish white luminous color due to reduction thereof. The fact that the example permitted the product to exhibit blue luminous color increased in energy as compared with the greenish white color would be due to a so-called quantum effect by preparation of the product in the form of fine particles.

EXAMPLE 3

Benzene soot in an amount of 1 g was charged in a quartz boat together with 0.64 g of cadmium chloride. The quartz boat was placed in a tubular oven and heated at 480° C. for 100 hours while being exposed to flowing of chlorine gas, leading to an interlaminar reaction. The interlaminar reaction progressed according to the following reaction formula:

$$9.2C + Cd(Ag)Cl_2 \rightarrow C_{9.2}Cd(Ag)Cl_2$$

Then, moist ammonia which contains moisture was flowed for 12 hours, resulting in replacement of the chlorine gas being carried out according to the following elimination reaction formula:

$$C_{9.2}CD(Ag)Cl_2 + 2NH_3 + H_2O \rightarrow Cd(Ag)O + 9.2C + 2NH_4Cl\uparrow$$

The elimination permitted nanoparticles of silver-activated cadmium oxide to be formed on a surface of the individual carbon nanotubes of soot. A size of the luminous oxide nanoparticles was determined depending on a size of the individual carbon nanoparticles (which was varied between 1 nm and 5 nm). It was confirmed that the thus-obtained specimen exhibited PL light of a red luminous color.

EXAMPLE 4

An activated carbon fiber material in an amount of 1 g was charged in a glass tube together with 1.1 g of zinc chloride and then the glass tube was sealedly closed, as in Example 2 described above. Then, the mixture was heated at 340° C. for 12 hours, resulting in being subject to an interlaminar reaction. The interlaminar reaction produced a composite product $C_{10}ZnC_{12}$. The zinc chloride was distributed on a surface of the carbon material which was formed with fine holes or pores of a size as small as nanometers. Then, the composite product thus synthesized was removed from the glass tube and then allowed to stand at 400° C. for 3 hours in a hydrogen sulfide stream, resulting in an elimination reaction. The elimination reaction leads to formation of hydrogen sulfide nanoparticles in the pores of the activated carbon fiber material. It was confirmed that the thus-obtained specimen exhibited PL light of a blue luminous color by ultraviolet excitation.

EXAMPLE 5

Benzene soot in an amount of 1 g was charged in a quartz boat together with 0.64 g of gallium chloride as in Example 3 described above. The quartz boat was placed in a tubular oven and heated at 250° C. for 3 hours while being exposed to a chlorine gas stream, resulting in an interlaminar reaction being carried out according to the following reaction formula:

$$9.2C + Ga(Zn)Cl_3 \rightarrow C_{9.2}Ga(Zn)Cl_3$$

Then, a product of the reaction was allowed to stand at 900° C. for 12 hours while being exposed to an ammonia stream, so that the following elimination reaction was carried out for replacement of chlorine gas:

$$C_{9.2}Ga(Zn)Cl_2 + 4NH_3 \rightarrow Ga(Zn)N + 9.2C + 3NH_4Cl\uparrow$$

As a result of the elimination reaction, zinc-activated gallium nitride in the form of nanoparticles was formed on a surface of the individual carbon nanotubes. It was confirmed that the thus-obtained specimen exhibited PL light of a blue luminous color.

While the present invention has been described with a certain degree of particularity with reference to the examples, obvious modifications and variations are possible in light of the above teachings. It is therefore to be understood that within the scope of the appended claims, the invention may be practiced otherwise than as specifically described.

What is claimed is:

1. A method for producing a phosphor, comprising the steps of:
    mixing a carbon material and an inorganic salt with each other to prepare a mixture, said inorganic salt being a compound which forms an interlaminar compound with the carbon material upon heating said mixture;
    heating the mixture, resulting in forming the interlaminar compound;
    subjecting said interlaminar compound to an elimination reaction so as to provide a luminous inorganic compound particle material adhered to said carbon material.

2. A method as defined in claim 1, wherein said carbon material is a fine carbon particle material of a nanostructure.

3. A method as defined in claim 2, wherein said fine carbon particle material of a nanostructure is selected from the group consisting of a carbon nanotube, a carbon fiber and soot.

4. A method as defined in claim 1, wherein said inorganic salt is selected from the group consisting of a chloride, a bromide, a nitrate and a mixed crystal thereof.

5. A method as defined in claim 1, wherein said elimination reaction uses an eliminating agent which is selected from the group consisting of oxygen, water, ammonia and hydrogen sulfide.

6. A method as defined in claim 1, wherein said inorganic compound particle material is selected from the group consisting of an oxide, a nitride and a sulfide.

7. A phosphor produced by a method as defined in claim 1 and including a carbon material of a nanostructure and a luminous inorganic compound particle material adhered to said carbon material.

8. A phosphor as defined in claim 7, wherein said inorganic compound particle material is selected from the group consisting of an oxide, a nitride and a sulfide.

* * * * *